Nov. 12, 1968          G. C. PETERSEN          3,410,390
                       CONVEYOR APPARATUS
Filed Jan. 13, 1967                          4 Sheets-Sheet 1

INVENTOR.
GEORGE C. PETERSEN
BY
Schapp & Hatch
ATTORNEYS

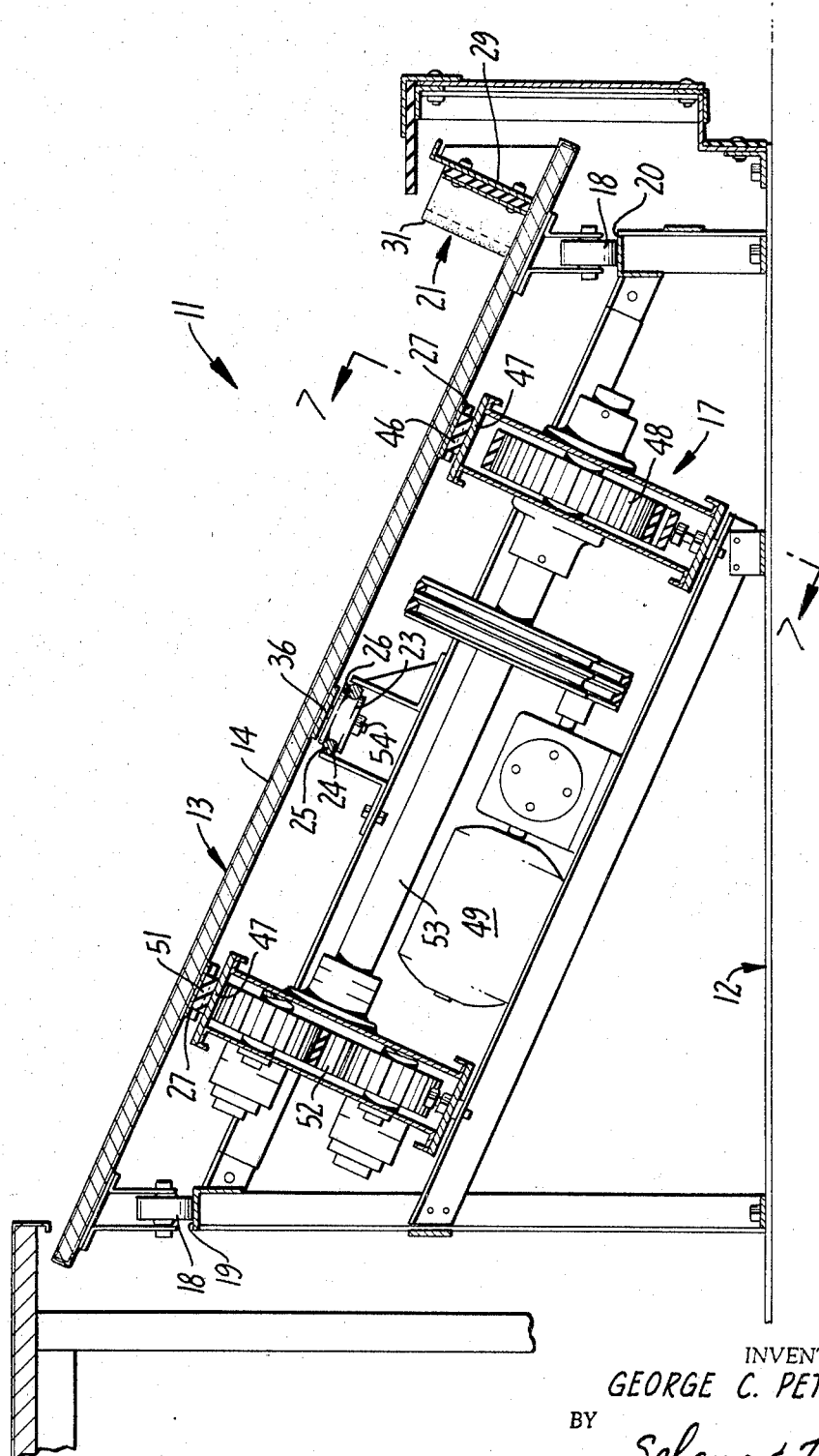

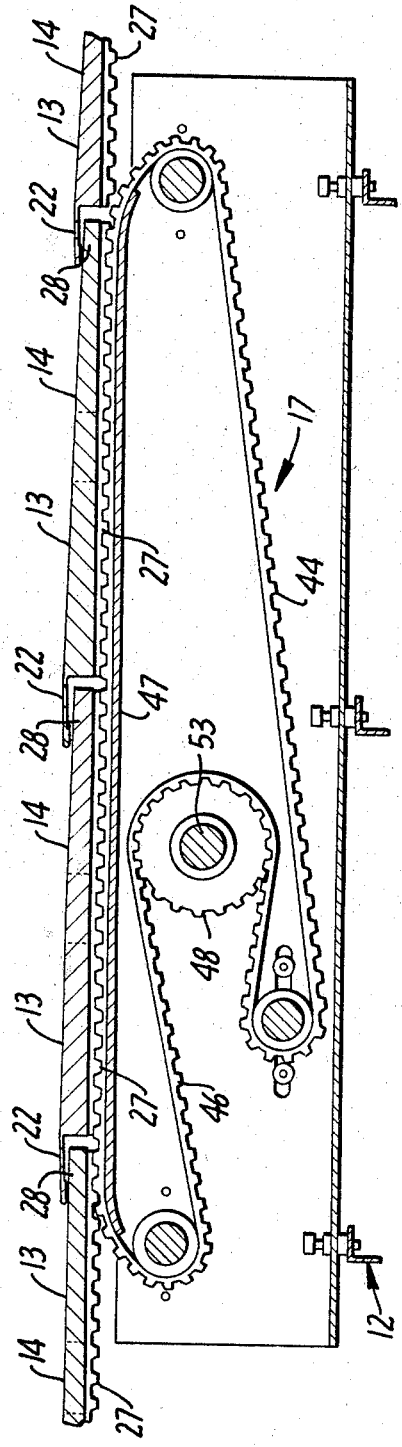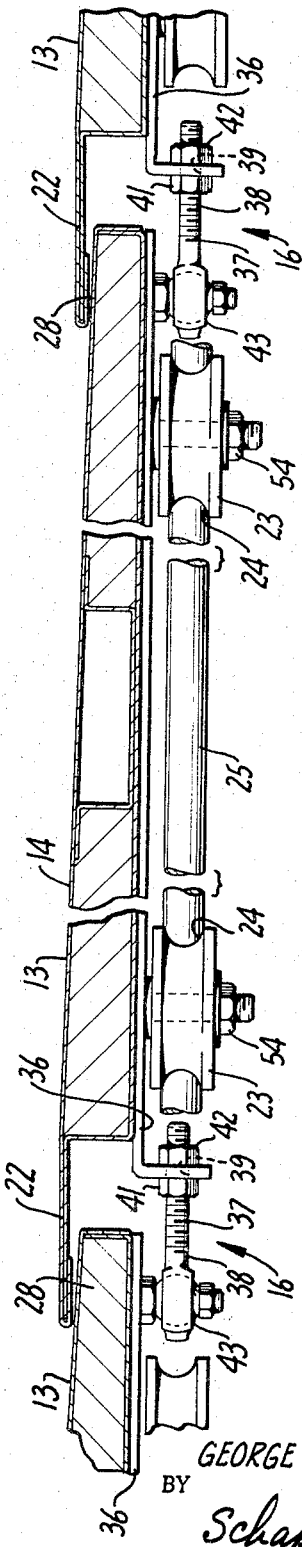

Nov. 12, 1968  G. C. PETERSEN  3,410,390
CONVEYOR APPARATUS
Filed Jan. 13, 1967  4 Sheets-Sheet 4

INVENTOR.
GEORGE C. PETERSEN
BY
Schapp & Hatch
ATTORNEYS

United States Patent Office 3,410,390
Patented Nov. 12, 1968

3,410,390
CONVEYOR APPARATUS
George C. Petersen, 349 Connecticut St.,
San Francisco, Calif. 94107
Filed Jan. 13, 1967, Ser. No. 609,116
9 Claims. (Cl. 198—129)

ABSTRACT OF THE DISCLOSURE

A baggage dispensing conveyor is formed of articulated pallets providing a continuous inclined surface. The pallets are joined by linking arms which permit articulation of the pallets with respect to each other so that the load bearing surface maintains its incline as it goes around corners. Each pallet has a depressed lip on one edge overlying the adjacent pallet to provide the continuous load-bearing surface. A cogged drive belt meshes with corrugations on the underside of the pallets to move the conveyor, and the pallets have a ribbed bumper at their lower end to stop lateral movement of the baggage.

Background of the invention

The present invention relates to a Conveyor Apparatus, and more particularly to a moving inclined platform for dispensing baggage and the like.

Rotating conveyors are commonly used in the baggage-claiming areas of passenger terminals to receive baggage from another conveyor and carry the baggage around in a horizontal circle so that passengers may easily inspect the baggage and select theirs from the group. Baggage is delivered to the rotating conveyor from another horizontal level by a feed conveyor operating inside the loop. These conveyors slope downwardly toward their outer edge so that when baggage is fed onto the circular conveyor, it slides down toward the outer edge by the force of gravity, to be stopped by a bumper structure. The baggage then travels around the path of the conveyor to the passengers waiting at the periphery of the conveyor along that path, remaining on the revolving circle of the conveyor until picked off by hand.

Circular conveyors, however, are limited in the periphery they can expose to the passengers for access to the baggage within a given floor area, and often represent an inefficient use of the available space. Such conveyors are commonly constructed like a merry-go-round, with the entire load-bearing surface fixed on a single rigid frame, and motive power is applied to the frame by a single drive unit to move the conveyor. This places practical limitations on the size of such rotating conveyors.

Summary

Applicant's baggage conveyor extends the periphery of access to the baggage without requiring excessive floor area by having both curved and straight sections, so that it may be constructed in a shape suitable to the space available. To translate from motion along a curve to linear motion while maintaining the desired incline, the present invention provides for articulation of sections of the conveyor bed with respect to each other. This is accomplished by forming the conveyor of a train of trapezoidal pallets spaced slightly from each other, with a lip covering the gap between pallets. The pallets roll along a fixed track and are flexibly linked to pull each other along while providing the necessary articulation.

The non-circular shape requires innovation in the application of driving power to the conveyor, and this is provided by applying the drive directly to the individual pallets as they pass the drive unit or units, thus permitting the use of more than one drive and providing flexibility of positioning.

A bumper which moves with the conveyor is highly desirable to prevent damage to the baggage or the conveyor. The present invention provides such a concurrently moving bumper by forming the bumper in sections attached to each pallet, with the bumper structure being formed to provide continuous bumper function even during articulation. The bumper is preferably in the form of lobes to reduce frictional contact with the baggage. Bags can then slide along one bumper section and remain stationary on another when the pallets move with respect to each other.

Accordingly, it is a principal object of the present invention to provide a conveyor apparatus having an inclined dispensing surface providing increased accessibility to objects such as baggage carried thereon.

A further object of the invention is to provide a baggage conveyor of the character described which may be formed in a non-circular path to more efficiently use available floor space.

It is another principal object of the present invention to provide a conveyor apparatus of the character described affording a relatively smooth, inclined load-bearing surface on both straight and curved portions of the conveyor path.

Still another object of the present invention is to provide a baggage conveyor of the character described formed of a string of articulated pallets and in which motive power may be applied to the pallets at one or more points along the conveyor.

Yet another object of the present invention is to provide a baggage conveyor of the character described having a bumper structure on each pallet cooperative to provide effectively continuous bumper function as the pallets articulate with respect to each other.

Further objects and advantages of the present invention will become apparent from the following detailed description and the accompanying drawings.

Brief description of the drawings

FIGURE 6 is an enlarged cross-sectional view of the conveyor at a drive unit, taken substantially on the plane of line 6—6 of FIGURE 2;

FIGURE 7 is a cross-sectional view of the drive means of the conveyor, taken substantially on the plane of line 7—7 of FIGURE 6;

FIGURE 8 is an enlarged fragmentary cross-sectional view of a part of the conveyor, taken substantially on the plane of line 8—8 of FIGURE 2;

Figures 1, 3:
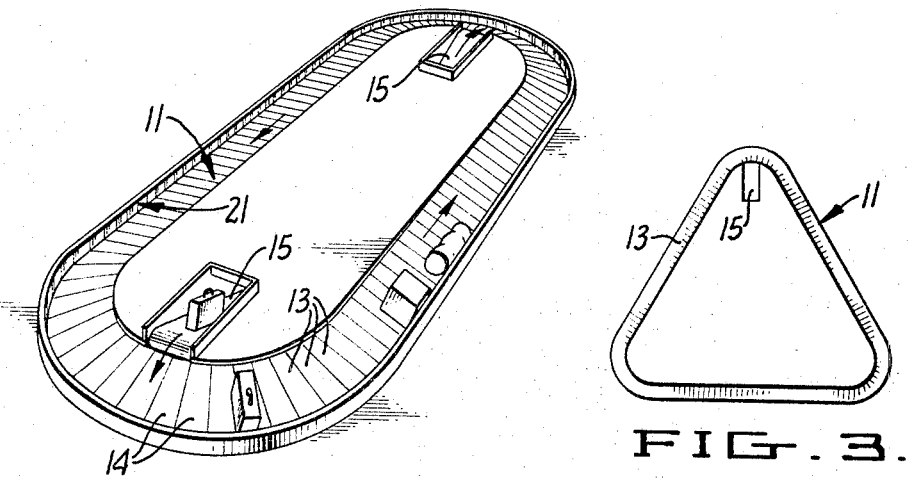
FIGURE 1 is a perspective view of a conveyor apparatus constructed in accordance with the present invention.
FIGURE 3 is a schematic plan view of an alternative layout of the conveyor apparatus of FIGURE 1.

While the preferred form of the invention is shown in the accompanying drawings and described herein, it will be apparent that various changes and modifications may be made within the ambit of this invention as defined in the accompanying claims.

Description of the preferred embodiment

Referring to the drawings in detail, it will be seen that the conveyor apparatus 11 of the present invention is formed of a base 12 having a string of pallet structures 13 movable thereon along a path defining closed horizontal loop. Each of the pallet structures 13 provides an inclined upper load-bearing surface 14 to which objects such as baggage are delivered in one-at-a-time order by a feed conveyor 15 operating from another horizontal level to the inside of the loop. These pallet structures 13 are connected together in endless chain fashion by a linkage 16 to move together along the path of the loop, the linkage 16 permitting individual pallet structures 13 to articulate with respect to each other. Drive means 17 is attached to base 12 in position for driving engagement with each of the pallet structures 13 as they advance along the loop.

Figures 4, 5:
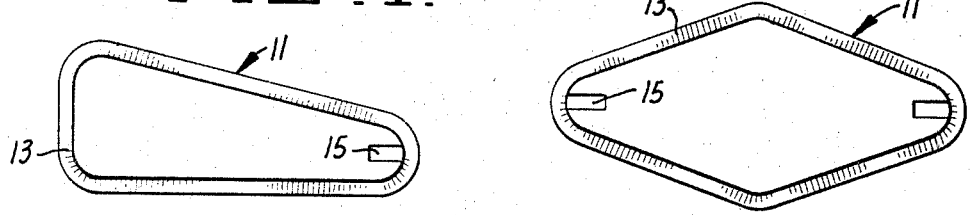
FIGURE 4 is a schematic plan view of another alternative layout of the conveyor apparatus of FIGURE 1.
FIGURE 5 is a schematic plan view of yet another alternative layout of the conveyor apparatus of FIGURE 1.
Figure 2:
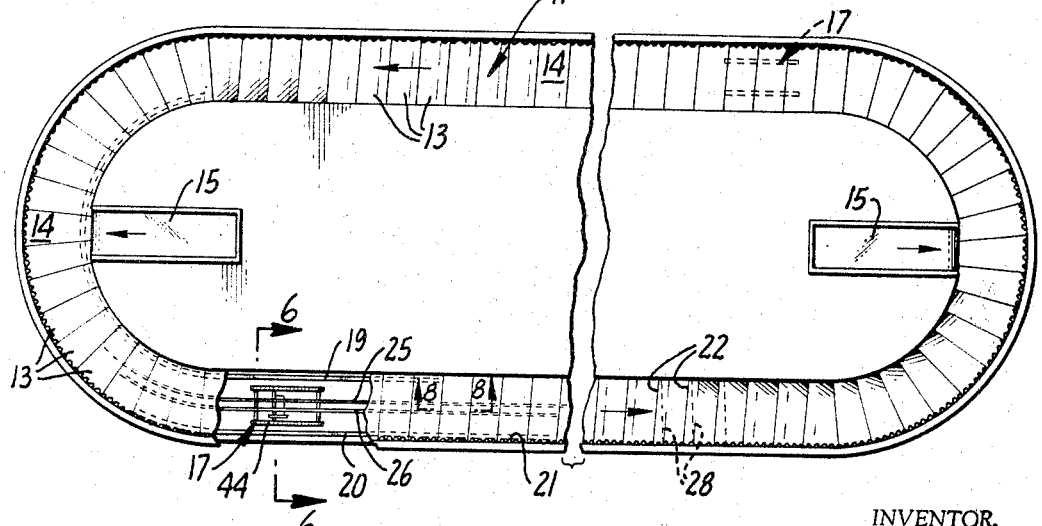
FIGURE 2 is a plan view of the conveyor apparatus of FIGURE 1.
Figure 9:
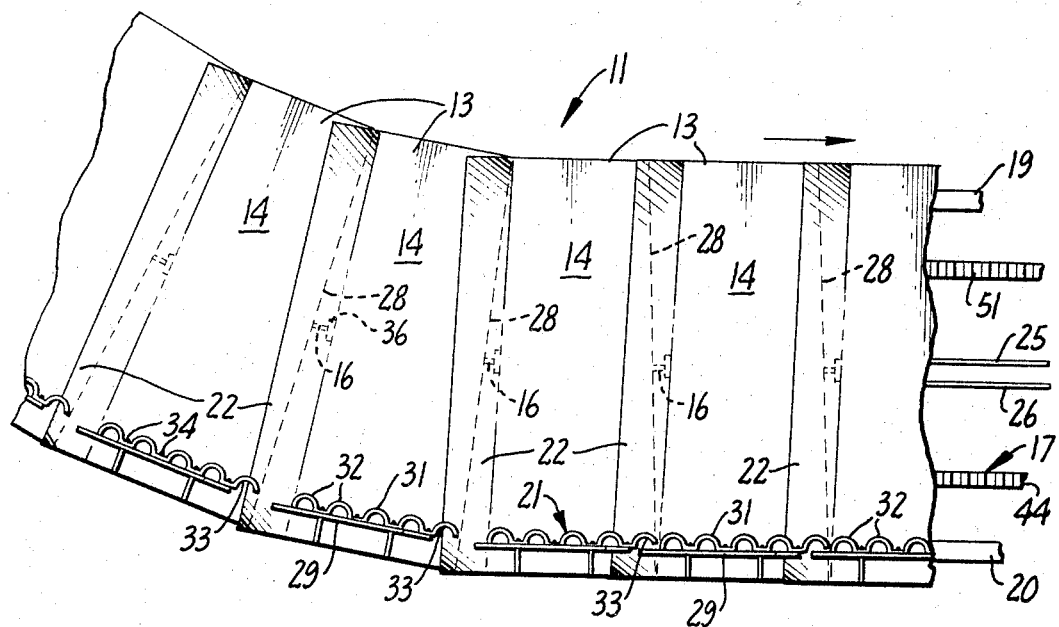
FIGURE 9 is a fragmentary developed plan view, on an enlarged scale, of a portion of a flight of the conveyor.
Figure 10:
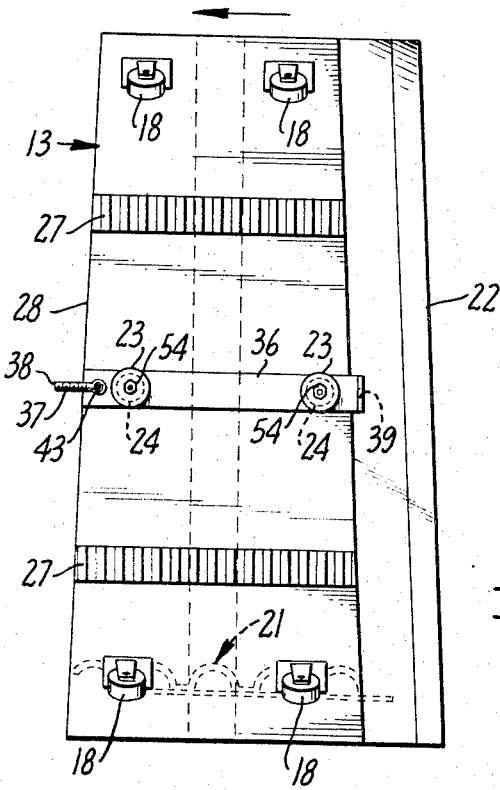
FIGURE 10 is an inverted plan view of an individual pallet of the conveyor.

The conveyor appartus 11 may be formed of both straight and curved sections in various configurations or layouts to suit the space available, as shown in FIGURES 3, 4 and 5. Of course, the particular shape is chosen to suit the floor space available, thus providing unexpected flexibility and efficiency.

The pallet structures 13 are formed with their load-bearing surface 14 inclined downward toward the exterior of the loop so that objects such as baggage will slide down to the outer edge. The pallet structures 13 are supported on rollers 18 attached to their undersides and adapted to run on spaced parallel tracks 19 and 20 attached to base 12. At the lower end of each of the pallet structures 13 is a shock-absorbing bumper 21 positioned for gently arresting movement of objects such as baggage as they slide down the load-bearing surface 14.

In order to permit the necessary articulating action of the inclined pallets as they round corners and still provide a continuous load-bearing surface, the pallet structures 13 are of a generally trapezoidal shape with the parallel sides of the trapezoid being shorter than the nonparallel sides and oriented generally parallel to the path of the conveyor 11. The load-bearing surface 14 of the pallet 13 is formed with a lip 22 extending along one of the nonparallel sides and overlying the adjacent pallet so as to avoid any gaps between pallets as they articulate. To strengthen the structure, the lip 22 is bent downward from the general plane of the load-bearing surface 14, as best seen in FIGURE 8, and the pallet 13 is made thinner along the nonparallel edge 28 which is overlain by the lip 22 of the preceding pallet 13. The thinness of the edge 28 of the pallet 13 allows the lip 22 of the preceding pallet to move relatively freely thereacross as the pallets emerge onto straight sections of the conveyor 11, and the bending down of lip 22 allows the load-bearing surface 14 to translate more smoothly between the adjacent pallets as they round the curves.

The bumper 21 here includes an L-shaped bracket 29, attached to the lower end of the load-bearing surface 14 of the pallet 13, and faced with a strip of resilient material 31, such as Neoprene rubber. Preferably, strip 31 is pleated into ribs 32 so that frictional contact with objects carried on the conveyor is reduced. A lip 33 is formed on one end of the bumper 21 to overlie a portion of the adjacent pallet, so that continuous bumper function is provided as the lower ends of the pallets 13 spread apart when the lower ends of the pallets round the curved portions of conveyor 11, see FIGURE 8. The inwardly tucked portions of the strip of resilient material 31 are fastened to the bracket 29 by appropriate means, such as screws 34.

The pallets 13 are kept in alignment on the tracks 19 and 20 by a pair of spaced guide rollers 23 attached to the underside of each pallet 13 midway between its ends, with the axes of the rollers 23 here shown as generally perpendicular to the pallet 13. Each of the rollers 23 is formed with a peripheral groove 24, so that roller 23 may roll between and be retained by a pair of spaced parallel guide rails 25 and 26 mounted on base 12 and defining the closed loop. The roller 23 serves to guide the pallets 13 along the path of the conveyor 11, to resist the lateral thrust imposed on the pallets by the objects borne by the pallets, and to resist any tendency of the pallets to buckle upwardly. While the rollers 23 as shown here are generally oriented with their axes perpendicular to the load-bearing surface 14, it may be appreciated that they could be mounted in other relationships, such as with their axes vertical.

The linkage 16 is attached to the underside of the pallet structures 13, and includes a bracket 36 attached to one pallet structure, an arm 37 having a threaded shank 38 passing through an aperture 39 in the bracket 36 and being retained therein by nuts 41, 42, and a ball and socket joint 43 attaching the other end of the arm 37 to the adjacent pallet structure 13. The nuts 41 and 42 allow the effective length of the arm 37 to be adjusted as necessary to take slack out of the train of pallets 13. Other flexible connections besides the ball and socket joint here shown could be used as well, so long as they adequately perform the desired function of permitting adjacent pallets 13 to articulate, that is, to roll, pitch, and yaw, with respect to each other without allowing extension of the pallets 13 with respect to each other, or in other words to increase their overall separation from each other along the path of the conveyor 11.

The drive means 17 includes a cogged drive member 44 which engages corresponding corrugations 27 on the underside of each of the pallet structures 13 as they pass by. The cogged drive member is here shown as an endless belt 46 of resilient material having lateral corrugations on its face, such as the type commonly referred to as a "timing belt." A shoe 47 holds the belt 46 in engagement with the pallets 13, and the resilience of the belt cushions both the drive means 17 and the pallet 13 from sudden load shocks. As may be seen, the weight of the pallets 13, together with the weight of the objects borne by the conveyor, tends to keep the belt 46 in engagement with the pallets 13. Alternatively, the corrugations 27 on pallets 13 could mesh directly with a rotating drive wheel having the appropriate cogs on its periphery, but the configuration here shown yields the advantage of allowing any desired number of cogs of the cogged drive member to simultaneously engage the pallet 13, or more than one pallet 13 for that matter, affording superior power transfer and less likelihood of slippage. Drive power is transmitted to belt 46 from a cogged drive wheel 48 driven by a conventional motive source such as motor 49 by wrapping the belt around the drive wheel 48 in a reentrant loop, so that the exterior surface of the belt meshes with a number of the cogs of cogwheel 48.

Since the individual pallets 13 are free to flex with respect to each other, care must be taken in the application of driving power to the pallets to prevent cocking of the pallets about an axis perpendicular to the pallet. To prevent such cocking and to improve the efficiency and smoothness of application of power to the pallets 13, the drive units 17 are here shown as including two spaced parallel belts 46 and 51, one on each side of the lateral midpoint of pallet 13, with the belts being formed to mesh with rows of corresponding corrugations 27 on each pallet 13. The drive wheels 48 and 52 for belts 46 and 51 are secured to a common shaft 53 driven by motor 49 to keep the two belts 46 and 51 and the pallets engaged thereby in lateral alignment.

As a feature of the invention, driving force may be applied to the belts at any desired location. Thus, the drive means 17 is here shown as including a plurality of the drive units described above. The drive units 17 usually will be located on straight sections of the conveyor 11, just downstream of the curved portions of the conveyor 11, so that the pallets 13 are pulled through the curved sections rather than pushed into them. Use of a plurality of drive units 17 rather than a single large drive means allows more flexible application of power to the conveyor at appropriate, distributed points for smoother and more efficient operation. If desired, the motors 49 may be the synchronous type to assure that they apply driving power to the conveyor at the same rate.

Individual pallets 13 may be easily removed from the conveyor 11 for servicing or replacement by removal of the nut 54 which retains guide roller 23 on pallet 13, and removal of nuts 41, 42 from arm 37. The individual pallet 13 can then be pulled out of the train of pallets without having to remove the entire train of pallets from the conveyor 11.

From the foregoing, it will be seen that the conveyor apparatus of the present invention provides a continuous inclined surface well adapted to support articles such as baggage in position for easy removal and to maintain the articles in such position as it traverses curved and straight portions. Thus, the conveyor can be arranged in a non-circular loop to take best advantage of available floor space.

I claim:
1. A conveyor apparatus, comprising:
   a base;
   a string of pallet structures movable on said base along a path defining a horizontal closed loop, each of said pallet structures providing an inclined load-bearing surface, with the higher end of said inclined load-bearing surface facing the interior of the loop, the lower end of each of said pallet structures being provided with a shock-absorbing bumper for arresting movement of objects down said inclined load-bearing surface, each of said pallet structures overlapping a pallet structure thereadjacent to provide a substantially continuous inclined load-bearing surface for said conveyor apparatus along the entire path of said loop;
   an articulated linkage connecting said pallet structures for joint movement along the path of the loop, said linkage permitting movement of individual pallet structures with respect to each other about non-parallel axes; and
   drive means engaging said pallet structures to advance the conveyor.

2. A conveyor apparatus as described in claim 1, and wherein said bumper is formed of a strip of resilient material pleated into ribs upstanding from said load-bearing surface.

3. A conveyor apparatus as described in claim 1, and wherein each of said pallet structures is in the form of a trapezoid oriented with the parallel sides of the trapezoid parallel to the path of said loop and has first and second non-parallel edges generally transverse to said path, said first edge of each of said pallet structures having a lip formed therealong, said lip overlying said second edge of the adjacent pallet structure to provide substantial continuity of said load-bearing surface during said articulation of said pallet structures relative to each other.

4. A conveyor apparatus as described in claim 3, and wherein said lip has its outer edge slightly depressed from the general plane of said load-bearing surface, said pallet structure being of lesser thickness in the direction perpendicular to said load-bearing surface along said second edge than along said first edge, so that said lip passes freely over said second edge.

5. A conveyor apparatus as described in claim 1, and wherein said pallet structures have rollers attached to the side thereof opposite said load-bearing surface and contacting said base to permit said pallet structures to roll thereon and said base includes two spaced parallel tracks running along said path and a pair of spaced parallel guide rails disposed between said tracks and running along said path, said rollers being attached to said pallet structures adjacent to the ends of said pallet structures and positioned to roll along said tracks, each of said pallet structures having a guide roller attached to the underside thereof and rolling between said guide rails, said guide roller having a groove in its periphery providing a minimum diameter slightly less than the spacing between said guide rails, the diameter of said guide roller at each side of said groove being greater than said spacing between said guide rails, whereby said guide roller will be retained between said guide rails as it rolls therealong for restraining said pallet structures against upward movement away from said base and against cocking with respect to each other while negotgiating curved portions of said path and against movement lateral to said path.

6. A conveyor apparatus as described in claim 1, and wherein said drive means is positioned for driving engaging with said pallet structures as said pallet structures move past said drive means and said drive means includes a cogged drive member in contact with the side of said pallet structures opposite to said load-bearing surface, said pallet structures having a ribbed portion on said side formed to mesh with said cogged drive member, said cogged drive member being a driven endless belt having lateral corrugations providing cogs on its face confronting said pallet structures.

7. A conveyor apparatus as described in claim 6, and wherein said endless belt is formed of a resilient material and said drive means includes a shoe supporting said endless belt againt movement away from said pallet structures so as to keep the cogs of said belt in engagement with said ribbed portion of said pallet structures.

8. A conveyor apparatus as described in claim 7, and wherein said drive means includes a cogged drive wheel connected to a source of motive power, a portion of said endless belt being formed in a reentrant loop contacting a portion of the circumference of said cogged drive wheel, so that the cogs of said cogged drive wheel engage the lateral corrugations on the side of said belt confronting the pallet structures to move the belt.

9. A conveyor apparatus as described in claim 8, and wherein said drive means includes two of said endless belts in spaced parallel relation and two of said cogged drive wheels, each engaging one of said endless belts, said cogged drive wheels being connected to a common shaft driven by said source of motive power to drive said endless belts in lateral alignment with each other.

References Cited

UNITED STATES PATENTS

| 1,626,492 | 4/1927  | Youngson      | 198—181 X |
| 2,219,724 | 10/1940 | Quick         | 198—181   |
| 2,936,556 | 5/1960  | Gibson        | 198—38 X  |
| 3,014,573 | 12/1961 | Baumann, et al. | 198—38  |
| 3,191,743 | 6/1965  | Rissler et al. | 198—16   |
| 3,360,104 | 12/1967 | Winfield      | 198—103   |
| 3,361,249 | 1/1968  | Cadman et al. | 198—103   |
| 2,150,610 | 3/1939  | Raffetto      | 198—181   |
| 2,548,061 | 4/1951  | Read          | 198—181   |

EVON C. BLUNK, *Primary Examiner.*

R. J. HICKEY, *Assistant Examiner.*